United States Patent [19]
Henry et al.

[11] 3,748,579
[45] July 24, 1973

[54] METHOD FOR DETERMINING CONCENTRATION PROFILES OF DEEP LEVELS ON BOTH SIDES OF A P-N JUNCTION

[75] Inventors: Charles Howard Henry, New Providence; Hiroshi Kukimoto, North Plainfield, both of N.J.

[73] Assignee: Bell Telephone Laboratories, Incorporated, Murray Hill, N.J.

[22] Filed: Nov. 12, 1971

[21] Appl. No.: 198,321

[52] U.S. Cl. .......................... 324/158 D, 324/61 R
[51] Int. Cl. ...................... G01r 31/22, G01r 27/26
[58] Field of Search ................... 324/158 D, 158 T, 324/158 R, 73 R, 61 R; 29/574

[56] References Cited
OTHER PUBLICATIONS

Spiwak; R. R., "Design and ...," IEEE Trans. On Inst. and Meas., Vol. IM-18, No. 3, September 1969, pg. 197–202.
Williams, R., "Determination of ...," Journal of App. Physics, Vol. 37, No. 9, August 1966, pg. 3411–3416.
Copeland, J. A., "A Technique ...," IEEE Trans. on Elect. Devices, Vol. ED-16, No. 5, May 1969, pp. 445–449.
Sah et al., "Thermal and ...," Solid State Electronics, Vol. 13, June 1970, pp. 759–785.

Primary Examiner—Rudolph V. Rolinec
Assistant Examiner—Ernest F. Karlsen
Attorney—W. L. Keefauver

[57] ABSTRACT

The deep level ("trap") impurity concentration, as a function of distance from a P-N junction in a semiconductor, is determined by a modified photocapacitance technique. This technique utilizes a sequence of operations involving a source of incident monochromatic optical radiation of different wavelengths (for emptying or filling a predetermined proportion of the deep levels of their captured charge carriers) and involving a cycling of a reverse voltage bias applied to the junction. The difference in electrical capacitance of the junction as measured before and after the optical irradiation of the junction, as a function of reverse voltage bias, is a measure of the concentration of deep levels as a function of distance from the P-N junction. The deep level concentration on both the P and the N side of the junction can thereby be determined.

10 Claims, 2 Drawing Figures

PATENTED JUL 24 1973  3,748,579

METHOD FOR DETERMINING CONCENTRATION PROFILES OF DEEP LEVELS ON BOTH SIDES OF A P-N JUNCTION

FIELD OF THE INVENTION

This invention relates to methods for testing semiconductors, in particular, for determining the concentration profile of deep trap levels lying within the energy gap of a semiconductor.

BACKGROUND OF THE INVENTION

In luminescent semiconductor devices, within the forbidden energy band gap of the semiconductor, ordinarily there are present certain levels ("traps") lying deep in this gap. By "deep" is meant significantly greater in energy difference from the valence or conduction energy band edge than the "shallow" levels (associated with acceptors or donors). In P-N electroluminescent devices (light emitting diodes, for example), these deep lying levels can function as nonradiative recombination centers for the injected minority carriers (holes in N-type, electrons in P-type semiconductor). Thereby, such traps in the neighborhood of a P-N junction of a light emitting diode tend to reduce the luminescent efficiency of the diode.

More particularly, in one type of red light emitting P-N junction semiconductive gallium phosphide diode, the emission of red light occurs from zinc-oxygen molecular type pairs in the neighborhood of the P-N junction. Typically, in such a diode there are unavoidably present unpaired oxygen atoms in this neighborhood of the P-N junction, these atoms functioning as traps in the P zone which enable injected electrons to recombine with holes nonradiatively (or else radiatively at an unwanted wavelength). Thereby, these oxygen traps compete with the zinc-oxygen pairs for these injected electrons. Thus, these oxygen traps reduce the number of injected electrons available for the desired capture and radiation by the zinc-oxygen pairs; therefore, these traps reduce the quantity of desired emitted light.

In the fabrication of electroluminescent semiconductive diodes, as a matter of quality control, it is therefore important to know the concentration of traps and where they are located (i.e., concentration profile) particularly with reference to the P-N junction. In the U.S. Pat. application Ser. No. 3,771 by J. A. Copeland, filed in the U.S. on Jan. 19, 1970, apparatus and methods are described for determining the deep level trap profile in a semiconductor in the neighborhood of a Schottky barrier (i.e., junction of a semiconductor with a method). However, such a technique is not readily adaptable for determining the trap level profile in the neighborhood of a P-N junction on both the P and the N side thereof.

Accordingly, it would be desirable to have a method for determining the trap level profile on either side of a P-N junction.

SUMMARY OF THE INVENTION

This invention is based on our discovery that the incremental contribution to the electrical capacitance ($\Delta C$) of a P-N junction in a semiconductor body due to trap levels is proportional to the concentration of those (and only those) trap levels which are filled with charge carriers in the neighborhood of the P-N junction. More particularly, we have devised a method for filling only a known proportion of the total trap levels to a known depth within the neighborhood of the P-N junction, so that a known proportion of these levels are occupied with charge carriers; and we have also thereby devised a method for determining the trap level concentration at the known depth in this neighborhood of the P-N junction. More particularly, in accordance with the invention, the known trap levels are selectively filled, to a given proportion in given neighborhoods of the P-N junction, by means of a combination of steps involving suitable optical irradiation and manipulation of reverse bias voltage. In manipulating the reverse bias voltage, in accordance with a feature of the invention, the magnitude of the reverse bias is reduced from a value $V_R$ to a value $V$ and then cycled back to the value $V_R$. Thereby, all trap levels are filled on the N side of the junction in the region between the edges of the depletion regions on the N side corresponding to $V_R$ and $V$; whereas all trap levels are emptied on the P side of the junction in the region between the corresponding edges of the depletion region on the P side of the junction; the trap levels elsewhere being unaffected by this cycling of reverse bias.

In a specific embodiment of this invention, for measuring the trap level concentration on the N side of the P-N junction, the junction is subjected to a reverse bias voltage ($V_R$) sufficient to produce a depletion region (shallow levels ionized) which includes the location(s) at which the trap level concentration is desired to be determined. While maintaining this bias voltage, the junction is irradiated with optical radiation having a wavelength suitable (sufficiently low photon energy) for emptying all trap levels within the depletion region (except for approximately five Debye lengths from the two opposite edges of the depletion region, where the trap level occupations are unaffected by any irradiation). Then, in the absence of the optical radiation, the reverse bias voltage is decreased to a value V such that the edge position ($x$) of the depletion region moves to a preselected location (on the N side of the junction) where it is desired to know the trap level concentration. Then, immediately thereafter the bias voltage is returned to the original reverse bias voltage, $V_R$. Thereby, all the trap levels on the N side of the junction are filled from the edge of the depletion region to the preselected location, but the trap levels on the P side remain empty as before. The electrical capacitance ($C_1$) of the body (due to the depletion region of the junction) is then measured, and thereafter again the junction is irradiated with optical radiation to empty all the trap levels (with the voltage bias at $V_R$). Finally, the capacitance ($C_2$) of the body (junction) is again measured (with the voltage bias at $V_R$). The difference in capacitance ($C_1-C_2$), the "incremental capacitance" ($\Delta C$), is then determined. It should be understood that commercial capacitance measuring devices (such as Boonton Model 71 Capacitance Meter) are available to monitor directly this difference $\Delta C$. The whole sequence of steps is repeated for a slightly different value of $V$, and hence for a slightly different value ($x$) of the edge position of the depletion region, together with a slightly different resulting value of $\Delta C$. The spatial rate of change of this incremental capacitance, $d(\Delta C)/dx$, can then be determined and is proportional to the total trap level concentration at this position $x$ on the N side of the junction.

In carrying out any sequence of steps for measuring the incremental capacitance ($C_1-C_2$) according to this invention, it is important that the temperature of the semiconductor body be maintained at a sufficiently constant value so that any variations in electrical capacitance, due to variations in thermal ionization of shallow donor or acceptor levels, be kept negligible as compared with variations in capacitance due to the filling and emptying of trap levels.

In another specific embodiment of the invention, adapted for measuring the trap level concentration on the P side of a P–N junction, the trap level concentration on the N side of the junction is first measured as described above. To every position on the N side, there corresponds a position on the P side, to wit, the edge of the depletion region on the P side when the junction is subjected to the reverse bias voltage $V$. In order to measure the trap level concentration on the P side at this corresponding position, the spatial rate of change of incremental capacitance ($d\Delta C/dx$) is again measured similarly as described before for the N side, but now using an irradiation having a different optical wavelength, so that a known fraction (nonzero) of the trap levels are emptied on both the N and P sides of the junction. The cycling of the reverse voltage bias ($V_R$ to $V$ to $V_R$) now empties all trap levels in a region on the P side of the junction, in addition to filling all trap levels in a region on the N side of the junction. Thus, a weighted proportion of the spatial rates of changes of incremental capacitance using the different optical wavelengths yields the trap level concentration on the P side of the junction.

BRIEF DESCRIPTION OF THE DRAWING

This invention together with its features, advantages, and objects may be better understood from the following detailed description when read in conjunction with the drawing in which.

DETAILED DESCRIPTION OF PREFERRED EMBODIMENTS

Figure 1:
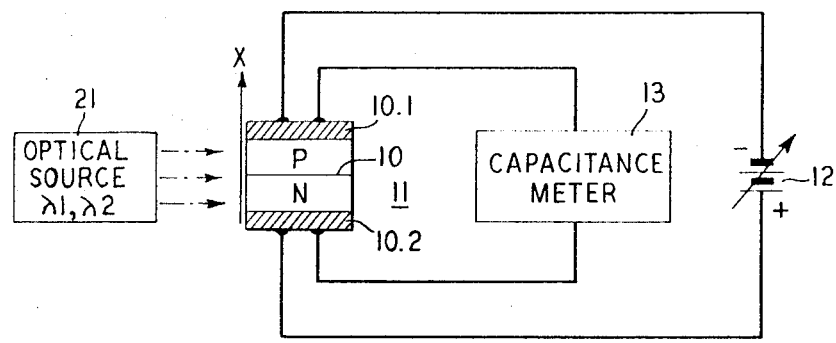
FIG. 1 is a schematic diagram of a circuit useful for carrying out the invention.

FIG. 1 shows a diagram of apparatus suitable for measuring the deep trap level concentration profile in the neighborhood of a P–N junction 10 in a semiconductor body 11; for example, oxygen traps in a semiconductive gallium phosphide. The body 11 is contacted by a pair of electrodes, 10.1 and 10.2, which are electrically connected to a battery 12 and a capacitance measuring device 13, typically a Boonton capacitance meter, which can read directly any changes in capacitance as well as absolute values of capacitance. The polarity of the battery 12 is arranged to provide a reverse bias voltage across the P–N junction 10. An optical source 21 furnishes optical radiation incident on the body 10, of wavelengths $\lambda_1$ and $\lambda_2$. Preferably, the optical radiation of wavelength $\lambda_1$ (or a narrow spectral range containing $\lambda_1$) is selected such that the probability for hole emission (by the deep level traps to be measured) is equal to zero ($e_P = 0$), but $e_N$ is not zero; whereas $\lambda_2$ (or a narrow spectral range) is selected such that $e_P$ is not equal to zero. For measuring deep level oxygen traps in gallium phosphide, $\lambda_1$ is selected in a range between about 9,500 angstroms and 13,500 angstroms; whereas $\lambda_2$ is selected in a range between about 7,300 angstroms and 8,300 angstroms, typically about 8,000 angstroms.

The preferred sequence of steps for measuring the incremental capacitance (and hence the concentration of deep levels therefrom) are as follows:

1. Set reverse bias voltage 12 at $V_R$.
2. Irradiate body 11 with $\lambda_1$ (or $\lambda_2$) from optical source 21.
3. Block off irradiation.
4. Cycle reverse bias voltage 12 from $V_R$ to $V$ and back to $V_R$.
5. Measure capacitance $C_1$ of junction 10 with capacitance meter 13.
6. Irradiate body 11 with optical source 21.
7. Measure capacitance $C_2$ of junction 10 with capacitance meter 13.

Thereby, the incremental capacitance, i.e., the difference $(C_1-C_2) = \Delta C$, can be determined. With available capacitance meters, this difference $\Delta C$ can be measured directly without separately measuring $C_1$ and $C_2$. Thereafter, steps 1 through 7 are repeated using a slightly different value for the reverse bias voltage $V$; thence $d(\Delta C)/dx$ is determined; and finally the concentration of deep levels are determined as explained below, according to equation (5) or (9). By "slightly different" is meant an increment sufficiently small that the resulting linear approximation of different quotients approximates the derivative $d(\Delta C)/dx$ as closely as desired.

In carrying out any sequence of steps 1 through 7 above, it is important to maintain the temperature of the body at a relatively constant temperature, particularly during the time between the measurements of $C_1$ and $C_2$ so that variations in the incremental capacitance ($\Delta C = C_1 - C_2$) due to variations in the thermal ionization of shallow (donor or acceptor) levels are negligible. Advantageously, for gallium phosphide containing deep oxygen trap levels, this temperature is kept constant to within $\pm 0.1°$ C. Likewise, the temperature should be kept low enough, and the measurements of $C_1$ and $C_2$ performed quickly enough, to prevent significant changes in the charge carrier occupations of the deep levels due to thermal excitation during and between each pair of measurements of $C_1$ and $C_2$. Again, for gallium phosphide containing the oxygen levels, a temperature of about 170° K is useful, although room temperature can also be used.

Figure 2:
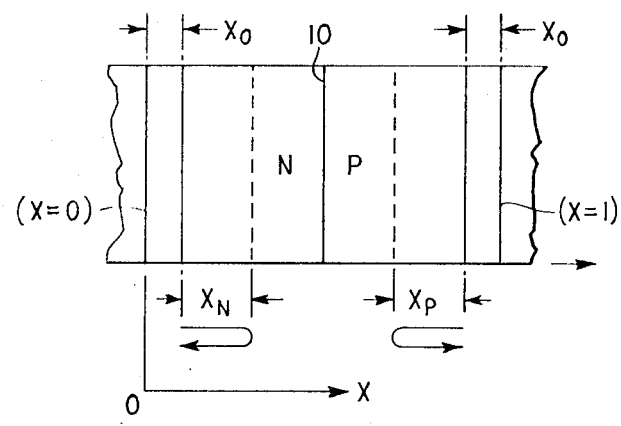
FIG. 2 is a schematic representation of a P–N junction useful for describing the theory of operation of the invention.

In order to measure the trap level concentration on the N side of the P–N junction 10, the following details are advantageously observed in carrying out steps 1 through 7 above. The reverse bias voltage supplied by the battery 12 is first set to a value $V_R$ (step 1), typically 10 volts, sufficient to create a depletion region in the neighborhood of the P–N junction 10 which is at least as wide to include all points ($x$) at which the concentration of deep levels is to be measured. In terms of the drawing (FIG. 2), this reverse bias voltage $V_R$ produces a depletion region in the neighborhood of the junction 10, running from $x = 0$ to $x = 1$. While maintaining this bias voltage $V_R$, the body 10 is irradiated (step 2) with optical radiation $\lambda_1$ from the source 21, sufficient to empty the charge carriers from all trap levels between $x = 0$ and $x = 1$ (except for approximately five Debye lengths, $x_0$, immediately adjacent to $x = 0$ and $x = 1$). Within the regions located from $x = 0$ to $x = x_0$, and from $x = (1-x_0)$ to $x = 1$, there are sufficient concentrations of free charge carriers (electrons and holes) that is not possible to change the occupation numbers of the deep trap levels merely by means of optical radiation. Typically, an irradiation of about $2 \times 10^{-3}$ watts/cm$^2$ of wavelength between about 9,500 angstroms and 13,500 angstroms for 100 seconds or more is suitable. Then the optical radiation is blocked (step 3) from the body 10, and the bias voltage 12 is quickly reduced in magnitude to a value $V$ which is less than $V_R$ and immediately returned back to its original value $V_R$ (step 4). As a consequence of the reduction of the bias voltage to the value $V$, the depletion region is reduced in size by an amount $x_N$ (FIG. 2) on the N side of the P–N junction 10 and by an amount of distance $x_P$ on the P side thereof; and then with $V_R$ again, the depletion region returns to its original width (see curved arrows in FIG. 2). The temporary reduction of bias voltage to $V$ brings the edge of the depletion region on the N side to $x = x_N$ and to $x = (1-x_p)$ on the P side. The distances $x_N$ and $x_P$ can be determined by known methods, such as described below. In any event, this consequent reduction of the width of the depletion region advantageously results in a value of $x_N$ corresponding to a position at which it is desired to measure the trap level concentration; and this movement of the edge of the depletion region fills the trap levels situated only in the region from $x = x_0$ to $x = (x_N+x_0)$. Then, after the bias voltage supplied by the battery 11 is returned to the earlier value $V_R$, the electrical capacitance $C_1$ of the P–N junction 10 is measured (step 5) by the capacitance meter 13. Thereafter (with $V_R$ still applied), the body 11 is again irradiated (step 6) by the optical source 21, which empties the trap levels from $x = x_0$ to $x = (x_N+x_0)$ (except for about the aforementioned five Debye lengths adjacent $x = 0$). Again, the capacitance $C_2$ of the junction 10 is measured (step 7), and the incremental capacitance $\Delta C_N = C_1 - C_2$ is thus determined. (With commercially available apparatus, this incremental capacitance can be measured directly by monitoring the capacitance as the junction capacitance goes from $C_1$ to $C_2$.)

The above-described steps 1 through 7 of capacitance measurements are then again performed, but with a slightly different voltage $V$, thus yielding a slightly different capacitance incremental capacitance $\Delta C_N$. The spatial rate of change, $d(\Delta C_N)/dx_N$ is proportional to the deep trap level concentration at $x = (x_0+x_N)$; therefore, it only remains to determine $x_N$ as a function of $V$.

In order to calculate the value of $x_N$ corresponding to the reverse bias voltage $V$, the following steps can be carried out. The (total) capacitance $C(V_R)$ of the junction 10 is measured under the reverse bias voltage $V_R$; and the (total) capacitance $C(V)$ of this junction is also measured under the lower reverse bias voltage $V$. The contribution to capacitance due to deep trap levels is ordinarily negligible as compared with the contribution to the capacitance due to the net significant shallow donor level concentration $N_D$ on the N side of the P–N junction 10 and the net significant shallow acceptor level concentration $N_A$ on the P side of this junction. Therefore, it follows from conventional theory that:

$$x_N + x_P = 1 - C(V_R)/C(V).$$

(1)

Knowing the concentration of net significant donors $N_D(x_N)$ on the N side of the junction, and net significant acceptors $N_A(x_P)$ on the P side, it likewise follows from theory that $$dx_N/dx_P = N_A(x_P)/N_D(x_N).$$

(2)

It should be understood that both $N_A$ and $N_D$ can be functions of $x$, although it is often a good approximation that their ratio $N_A/N_D$ is constant; and in any event, $N_A$ and $N_D$ can be determined by known techniques, such as set forth in Appendix A below for example.

Although equations (1) and (2), in general, would require numerical integration, these equations can be simply solved for the case of constant $(N_D/N_A)$ ratio, to wit, $$x_N(1+N_D/N_A) = 1 - C(V_R)/C(V)$$

(3.1)

and $$x_P(1+N_A/N_D) = 1 - C(V_R)/C(V)$$

(3.2)

From equations (3.1) and (3.2), $x_N$ and $x_P$ can be determined as a function of reverse bias voltage $V$, as desired for correlating the measurements of $\Delta C_N$ as a function of $x$.

Having thus correlated the measurements of $\Delta C_N$ as a function of $x_N$, the various values of $\Delta C_N$ serve as a basis for determining the concentration $N_t(x)$ of deep trap levels as a function of $x$. In order to compute this $N_t(x)$, it is first to be noted that for a concentration $n_t(x)$, of filled deep trap levels, their contribution to the incremental capaictance is:

$$\Delta C_N = -C \int_0^1 dx n_t(x) \cdot [(x/N_A) - (1-x)/N_D].$$

(4)

(The empty deep trap levels do not contribute to the capacitance.) Therefore, in the above-described sequence of steps for determining $\Delta C$ (remembering that the optical radiation affected only those deep levels situated a distance of $x_0$ or more from the P–N junction), it follows that $N_t(x)$ is effective in the integrand of equation (4), as a filled level $n_t(x)$, only between $x = x_0$ and $x = x_0 + x_N$; hence, differentiating equation (4) with respect to $x_N$ (in the upper limit of the integral) yields:

$$d(\Delta C)_N/dx_N = -C\, N_t(x_0+x_N)[(x_0+x_N)/N_A - (1-x_0-x_N)/N_A].$$

(5)

Thus, from equation (5), the deep level trap concentration $N_t$ at $(x_0+x_N)$ can be calculated from the knowledge of the other parameters. However, as proceeded thus far, only $N_t(x)$ on the N side of the junction 10 can be found.

In order to determine the trap concentration $N_t$ on the $P$ side of the junction 10, it is necessary to proceed further with steps 1 through 7 above, but with optical radiation $\lambda_2$. Again, the bias voltage 11 is set at $V_R$; and the body 11 is irradiated with optical radiation $\lambda_2$ from the source 21. In this case, $\lambda_2$ is selected such that a known nonzero ratio of deep trap levels are filled all the way from $x = x_0$ to $x = (1-x_0)$. For example, for oxygen levels in gallium phosphide, $\lambda_2$ is advantageously in the range between about 7,300 Angstroms and 8,300 Angstroms. Thus, the filled trap density will be given by:

$$n_t = N_t\, e_P/(e_N + e_P) = N_t r, \tag{6}$$

where $e_P$ and $e_N$ are the known hole and electron emission rates for deep trap levels irradiated with the optical radiation of wavelength $\lambda_2$. (For a method to determine the ratio, $r = e_P/(e_N + e_P)$, see Appendix B below.) Then, with the traps filled to the extent $n_t$ given by equation (6), all irradiation is removed from the body 11, and the bias voltage 12 is cycled from $V_R$ to $V$ and back to $V_R$. As a consequence, this cycling of voltage now has rendered empty all deep trap levels in the region $(1-x_0)$ to $(1-x_0-x_P)$, but renders completely filled all those deep trap levels lying in the region extending from $x_0$ to $(x_0+x_N)$, and leave only partially filled in the proportion $e_P/(e_N+e_P)$ all those deep trap levels from $(x_0+x_N)$ to $(1-x_0-x_P)$. In this condition of trap level ionization profile, the capacitance $C_1'$ of the body 10 is measured by the capacitance meter 13. Again, the body 10 is irradiated with $\lambda_2$ from the optical source 21, thereby partially filling to the extent $(e_P/e_N+e_P)$ the deep level traps situated from $(1-x_0-x_P)$ to $(1-x_0)$, and likewise rendering only partially full to the extent $e_P/(e_N+e_P)$ those deep trap levels located from $x_0$ to $(x_0+x_N)$. Once again, in this last condition of partial trap ionization, the capacitance $C_2'$ of the body 10 is measured by the capacitance meter 13. With available apparatus, the change in capacitance $(C_2'-C_1')$ can be monitored directly. This increment $\Delta'C = C_2'-C_1'$ has two contributions; one from the reduction in filled trap levels on the N side of the junction, the other contribution from the increase in filled trap levels on the P side of the junction (both due to the preceding step of optical irradiation). Thus, $\Delta'C = \Delta'C_N + \Delta'C_P$ as follows:

$$\Delta'C_\mathrm{P} = Cr\int_{1-x_0-x_\mathrm{P}}^{1-x_0} dx\, N_t(x)[x/N_A - (1-x)/N_\mathrm{D}]$$

$$\Delta'C_\mathrm{N} = C(r-1)\int_{x_0}^{x_0+x_\mathrm{N}} dx\, N_t(x)[x/N_A - (1-x)/N_\mathrm{D}]. \tag{7}$$

It therefore follows from equation (4), and the discussion following it, that:

$$\Delta'C_N = (1-r)\Delta C_N, \tag{8}$$

where $\Delta'$ refers to the measurements with optical wavelength $\lambda_2$, and $\Delta$ refers to the earlier described measurements with $\lambda_1$. Taking the spatial derivative of $\Delta'C$ with respect to $x_P$:

$$d(\Delta'C)/dx_\mathrm{P} = (1-r)d(\Delta C_\mathrm{N})/dx_\mathrm{N} \cdot (dx_\mathrm{N}/dx_\mathrm{P})$$
$$+ CrN_t(1-x_0-x_\mathrm{P})[(1-x_0-x_\mathrm{P})N_A - (x_0+x_\mathrm{P})/N_\mathrm{D}]. \tag{9}$$

Knowing the ratio $r$ at wavelength $\lambda_2$, and knowing $\Delta C_N$ as a function of $x_N$ from the earlier measurements (with $\lambda_1$), and $\Delta'C$ as a function of $x_P$ (with fixed $\lambda_2$ and various values for $V$, and hence as a function of $x_P$), it is now straightforward to calculate $N_t$ at $x = (1-x_0-x_P)$ from equation (9). That is, the concentration of deep trap levels $N_t$ at locations on the P side of the junction 10 in the body 11 can now be calculated from equation (9), as desired in this invention.

It should be remembered that it is important that the temperature of the body 11 should be kept constant during all steps of this invention, advantageously to within $\pm 0.1°\mathrm{K}$, in order that variation in thermal ionization of shallow levels be kept negligible as compared with the known emission rates, $e_N$ and $e_P$, of the deep levels induced by the optical radiation from the source 21. For deep oxygen trap levels in gallium phosphide, this temperature is advantageously about 170° K, but can be room temperature.

As an alternative to the above recited order of sequence of steps, it is possible to carry them out, at some sacrifice of accuracy, in the following order of sequence:

A. Set reverse bias voltage 11 at $V_R$.
B. Irradiate body 10 with $\lambda_1$ (or $\lambda_2$) from optical source 21.
C. Measure capacitance $(C_2)$ of junction 10 with capacitance meter 13.
D. Block off irradiation.
E. Cycle reverse bias voltage 11 from $V_R$ to $V$ and back to $V_R$.
F. Measure capacitance $(C_1)$ of junction 10 with capacitance meter 13.

Then the capacitance difference $(C_1-C_2) = \Delta C$ is determined, or else $\Delta C$ determined directly by monitoring the capacitance change with available apparatus; and the steps A through F are repeated using a slightly different value for the reverse bias voltage $V$, in order to find $d(\Delta C)/dx$, just as discussed above in connection with steps 1 through 7. This sequence, A through F, however, suffers from some sacrifice of accuracy as compared with the preferred sequence 1 through 7 described earlier, due to errors arising in $\Delta C$ attributable to the difficulty in setting the maximum reverse bias voltage back at precisely the same value $V_R$ after cycling back from the lower value $V$; whereas in the preferred sequence of steps 1 through 7, any such errors arising in $\Delta C$ are minimized.

It should be understood that the sequences of steps for determining the concentration profile of deep level traps from the capacitances $C_1$ and $C_2$ can be automated. For example, the outputs of the capacitance meter 13 can be in the form of electrical signals which are directly proportional to the incremental capacitances $(\Delta C = C_1-C_2)$ corresponding to the voltage biases $V$, and hence to distances $x_N$ (or $x_P$). Then these incremental capacitance signals $(\Delta C)$ can be fed to an operational differentiator for yielding electrical signals proportional to the derivative (difference quotient) $d(\Delta C)/dx$. Finally, the signals $d(\Delta C/dx)$ can be processed to yield a set of electrical signals proportional to the trap level concentration $N_t$ as a function of $x_N$ (or $x_P$) in accordance with equation (5) (or (9)).

While this invention has been described in detail in terms of deep levels due to oxygen impurity atom in gallium phosphide, the profile of many other combinations of deep impurity levels in semiconductors can be measured using the above-described sequence of steps. Thus, the deep level impurity concentration of the various combinations may be measured using the above-described techniques, such as deep level killer centers (whether identified chemically or not) in gallium arsenide, gallium phosphide; trap levels at interface of heterostructures of gallium arsenide - gallium aluminum arsenide; deep level zinc-oxygen complexes in gallium phosphide; and deep level gold trap levels in silicon.

Although the invention has been described in terms of specific embodiments, many modifications are possible by the worker of ordinary skill in the art without departing from the scope of the invention.

APPENDIX A

In order to determine the profile of the net significant donor and acceptor impurities ($N_D$ and $N_A$) in the neighborhood of the junction 10 (where the edges of the depletion regions are located), the following method is useful. The technique described by J. A. Copeland III in his U. S. Pat. No. 3,518,545 (issued on June 30, 1970) is first used to determine $(N_A^{-1} + N_D^{-1})$ in this neighborhood as a function of $x_P$ (and the corresponding $x_N$) at various reverse voltage biases. In order to determine separately the values of $N_A$ and $N_D$ in the neighborhood of the junction, the values of $N_A$ and $N_D$ in regions removed from the junction 10 can be found separately in P-type region and the N-type region in accordance with the techniques described in said U.S. Pat. No. 3,518,545, by means of auxiliary Schottky barriers formed on an angle lapped (typically 2°) side surface of the body 11. Typically, these Schottky barriers are formed by metal contacts approximately 1 mil in diameter (whereas the width of the depletion region of the junction is typically less than a micron). Thereby, the asymptotic values of $N_A$ and $N_P$ in regions removed from the junction are determined, and then the individual values of $N_A$ and $N_D$ in the neighborhood of the junction 10 are determined as a function of position by asymptotically fitting the profile of $N_A$ and $N_D$ as functions of position, using the knowledge of $(N_A^{-1} + N_D^{-1})$ as a function of position in the neighborhood of the junction.

APPENDIX B

In order to determine the value of $r = e_P/(e_P + e_N)$, a function of wavelength as defined in equation (6), for use in equation (9), the following procedure can be used. At fixed reverse voltage bias $V_R$, the body 11 is irradiated by source 21 with optical radiation of wavelength $\lambda_2$ sufficient to fill the traps partially. Then the body 11 is irradiated with wavelength $\lambda_1$ from source 21, whereby all the traps are emptied, while the capacitance of the body (and hence of junction 10) is monitored by the capacitance meter 13 as a function of time at the fixed bias $V_R$. The time constant for the capacitance to arrive at its new equilibrium value in the presence of the radiation $\lambda_1$ from source 21 is equal to $(1/e_N)$ corresponding to $\lambda_1$. Thus, $e_N(\lambda_1)$ can be found as the reciprocal of this time constant. By using different values of $\lambda_1$ (advantageously at fixed $V_R$ and $\lambda_2$) $e_N$ can then be found as a function of $\lambda_1$ (i.e., for wavelengths which completely empty all traps).

Then, with all traps initially empty, the body 11 is irradiated with optical radiation of wavelength $\lambda_2$ from the optical source 21, suitable for partially filling the traps, while the capacitance is again monitored as a function of time. This time constant of the capacitance to reach its new equilibrium value, in the presence of radiation $\lambda_2$, is equal to $1/(e_N + e_P)$ at $\lambda_2$. Thus, the value of $(e_N + e_P)$ corresponding to wavelength $\lambda_2$ can be found as the reciprocal of this time constant. By varying the value of $\lambda_2$, advantageously at fixed $\lambda_1$ and $V_R$, the values of $(e_N + e_P)$ can be determined as a function of $\lambda_2$.

It now remains to find $e_P$ itself as a function of $\lambda_2$. In order to accomplish this, the curve of $e_N$ as a function of $\lambda_1$ (all traps empty) is extrapolated, by a trial approach, to the optical region of wavelengths $\lambda_2$ (traps partly empty). Thereby, a trial curve of $e_N$ via $\lambda_2$ can be plotted, and thence also a "trial" curve of $r$ vs. $\lambda_2$ can be plotted using the earlier found values of $(e_N + e_P)$. Then the capacitance of the body 11 is measured with all traps emptied (by suitable radiation $\lambda_1$ from source 21) as compared with the traps filled to the extent of the ratio $r = e_P/(e_N + e_P)$ when irradiated with wavelength $\lambda_2$ from source 21. The difference in these capacitance measurements (at fixed voltage bias) is equal to $r = e_P/(e_N + e_P)$ to within a multiplicative constant. Thus, by using different values of $\lambda_2$ (with fixed $\lambda_1$ and voltage bias), an experimentally found curve of $Ar$ vs. $\lambda_2$ can be plotted, where $A$ is the multiplicative constant; so that the trial curve, if correct, should be identical to this experimental curve for some value of the multiplicative ("normalization") constant, $A$. If no such constant $A$ can be found, that is, if no normalizatiion factor can be found to reconcile the "trial" curve of $r$ vs. $\lambda_2$, then different trial extrapolations of the curve of $e_N$ vs. $\lambda_1$ to optical regions of wavelengths $\lambda_2$ are tried, until a multiplicative constant $A$ can be found to reconcile the trial curve of $r$ vs. $\lambda_2$ with the experimentally found curve of $r$ vs. $\lambda_2$. Thereby, $r$ can be found both in optical regions of wavelengths $\lambda_2$ (traps partly empty) and in regions of wavelengths $\lambda_1$ (traps all empty).

What is claimed is:

1. A method for testing a semiconductor body which comprises:
   a. applying a first voltage bias across the body;
   b. irradiating the body under the first voltage bias, for a first predetermined period of time;
   c. decreasing the magnitude of the voltage applied across the body to a second voltage bias and thereafter increasing the magnitude of the voltage bias to the first voltage bias, to produce a first condition of the body;
   d. irradiating the body for a second predetermined period of time, to produce a second condition of the body; and
   e. measuring the change in electrical capacitance of the body in going from the first to the second condition.

2. A method for testing a semiconductor body which comprises:
   a. applying a first voltage bias across the body;
   b. irradiating the body, under the first applied voltage, for a first predetermined period of time;
   c. decreasing the magnitude of the voltage applied across the body to a second voltage bias and thereafter increasing the magnitude of the voltage applied across the body back to the first voltage bias, to produce a first condition of the body;
   d. irradiating the body for a second predetermined period of time, to produce a second condition in the body; and e. developing an electrical signal indicative of the difference in electrical capacitance of the body going from the first to the second condition.

3. A method for testing the neighborhood of a P–N junction of a semiconductor, comprising the steps of:
   a. applying a reverse bias voltage $V_R$ across the P–N junction in order to produce a depletion region in the neighborhood of the junction;
   b. irradiating the junction with optical radiation of wavelength and intensity sufficient for producing a condition of the junction throughout the first depletion region produced by the bias voltage $V_R$, said depletion region characterized by a first predetermined ratio of deep levels which are empty of charge carriers to deep levels which are filled with charge carriers;
   c. varying the reverse bias voltage (in the absence of said optical radiation) from $V_R$ to a predetermined value $V$ and then back to $V_r$, said value $V$ corresponding to a second smaller width of the depletion region, in order that the junction be in a second condition characterized by a second predetermined ratio of deep levels which are empty of charge carriers to deep levels which are filled on the N side of the P–N junction in the semiconductor between the edges of the first and second depletion regions, and characterized by the first predetermined ratio elsewhere in the first depletion region;
   d. irradiating the junction with optical radiation for returning the junction into substantially the first condition; and
   e. measuring the difference in electrical capacitance $C_2$ across the junction going from the second condition to substantially the first condition.

4. A method for testing a semiconductor body which comprises the steps of
   a. applying a reverse bias voltage $V_R$ across the P–N junction in order to produce a first depletion region having a first width in the neighborhood of the junction;
   b. irradiating the junction with optical radiation of wavelength and intensity sufficient for producing a first condition of the junction throughout the first depletion region characterized by a first predetermined ratio of deep levels which are empty of charge carriers to deep levels which are filled with charge carriers;
   c. varying the reverse bias voltage (in the absence of said optical radiation) from $V_R$ to a predetermined value $V$ and then back to $V_R$, said value $V$ corresponding to a second smaller width of the depletion region, in order that the junction be in a second condition characterized by a second predetermined ratio of deep levels which are empty of charge carriers to deep levels which are filled with charge carriers on the N side of the P–N junction in the semiconductor between the edges of the first and second depletion regions and by the first predetermined ratio elsewhere in the first depletion region;
   d. irradiating the junction with optical radiation for returning the junction into substantially the first condition; and
   e. developing a first electrical signal indicative of the difference electrical capacitance of the junction going from the second to substantially the first condition.

5. The method recited in claim 4 which further comprises the steps of repeating the recited steps (a) through (e) with a different value of V to develop a correspondingly different second electrical signal ($S'$), and then developing a third electrical signal indicative of the difference in signals, $S'-S$.

6. The method recited in claim 4 in which the body is essentially gallium phosphide and the wavelength is between about 9,500 Angstroms and 13,500 Angstroms.

7. A method comprising the steps recited in claim 4 in which the body is essentially gallium phosphide which is maintained at a predetermined temperature to within $\pm 0.1°$ C throughout the steps (d) and (e).

8. A method for testing a semiconductor body containing a P–N junction which comprises:
   a. optically irradiating the body, under a first voltage bias applied thereacross, for a first predetermined period of time to produce a first condition in the body, said irradiating being sufficient to effect an emptying of a predetermined proportion of deep impurity levels in a given neighborhood of the P–N junction;
   b. decreasing the magnitude of the voltage applied across the body to a second voltage bias and thereafter increasing the magnitude of the voltage applied across the body back to the first voltage bias, to produce a second condition of the body; and
   c. developing an electrical signal indicative of the change in capacitance of the body going from the first to the second condition.

9. A method for testing a semiconductor body containing a P–N junction which comprises the steps of:
   a. optically irradiating the body, under a first voltage bias applied thereacross, for a first predetermined period of time to produce a first condition in the body, said irradiating being sufficient to effect an emptying of a predetermined proportion of deep impurity levels in a given neighborhood of the P–N junction;
   b. decreasing the magnitude of the voltage applied across the body to a second voltage bias and thereafter increasing the magnitude of the voltage applied across the body back to the first voltage bias, to produce a second condition of the body; and
   c. measuring the change in electrical capacitance of the body going from the first to the second condition.

10. A method for testing a semiconductor body comprising the steps recited in claim 9 in which the body is gallium phosphide which is maintained at a predetermined temperature during the steps (b) and (c) to within $\pm 0.1°$ C.

* * * * *